No. 749,013. PATENTED JAN. 5, 1904.
A. A. ANDERSON.
MACHINE FOR FORMING SLEEVES, COUPLINGS, OR THE LIKE.
APPLICATION FILED JUNE 24, 1903.
NO MODEL. 3 SHEETS—SHEET 1.
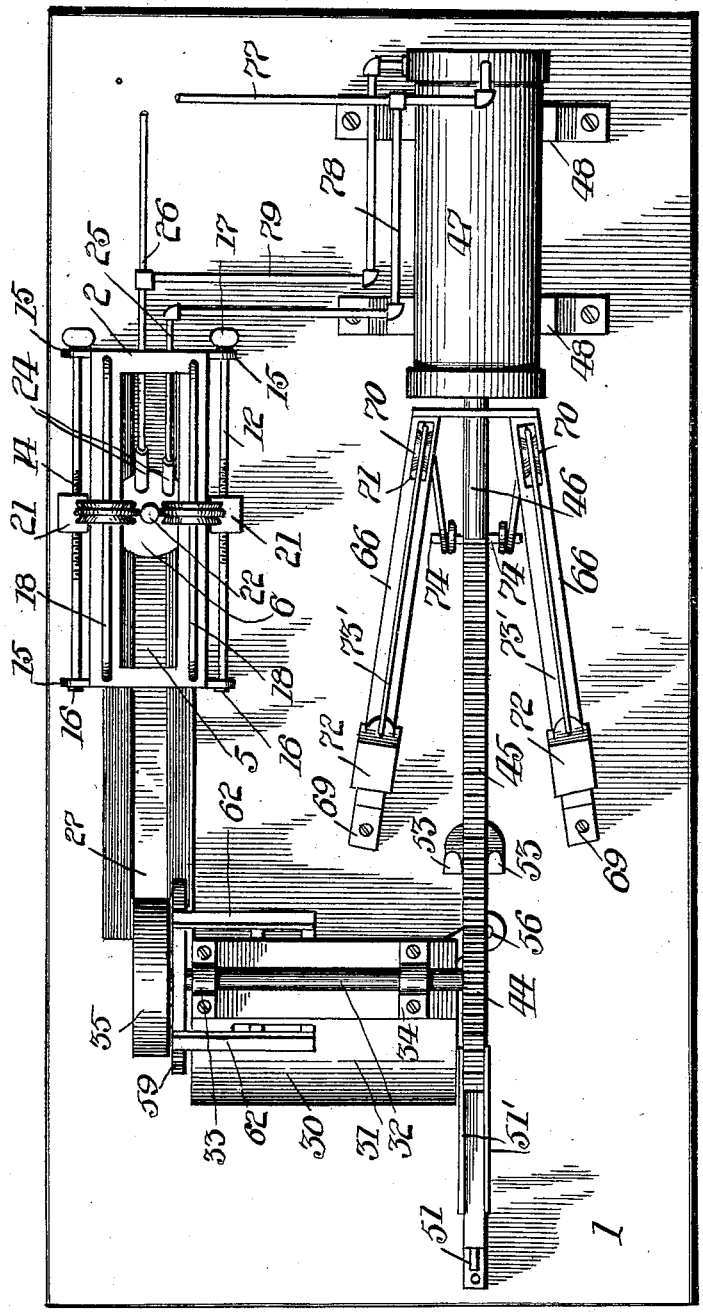
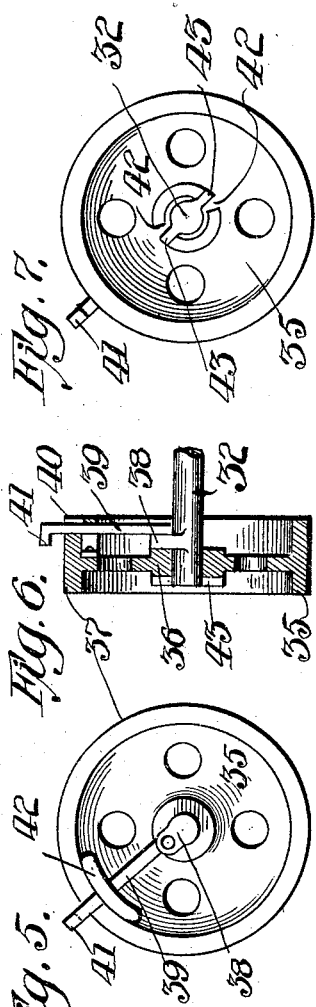

No. 749,013. PATENTED JAN. 5, 1904.
A. A. ANDERSON.
MACHINE FOR FORMING SLEEVES, COUPLINGS, OR THE LIKE.
APPLICATION FILED JUNE 24, 1903.
NO MODEL. 3 SHEETS—SHEET 2.
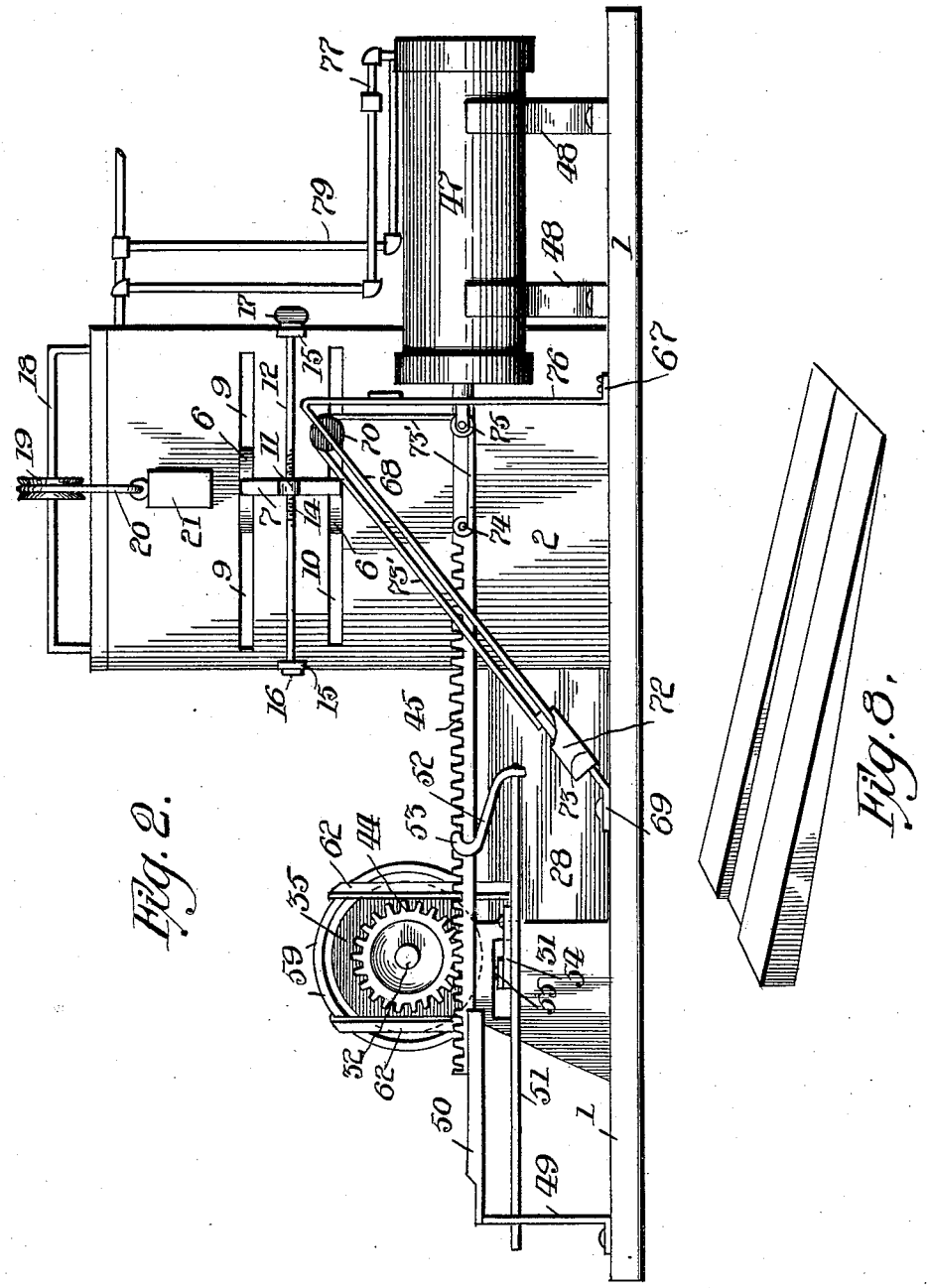
Witnesses:
R. H. Butten,
E. E. Potter.
Inventor,
A. A. Anderson,
By N. C. Evert & Co.
Attorneys.

No. 749,013. PATENTED JAN. 5, 1904.
A. A. ANDERSON.
MACHINE FOR FORMING SLEEVES, COUPLINGS, OR THE LIKE.
APPLICATION FILED JUNE 24, 1903.
NO MODEL. 3 SHEETS—SHEET 3.
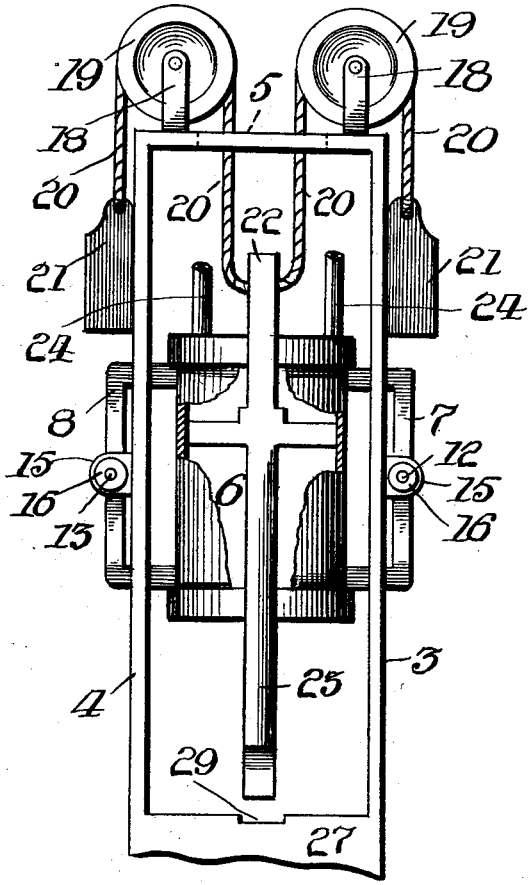
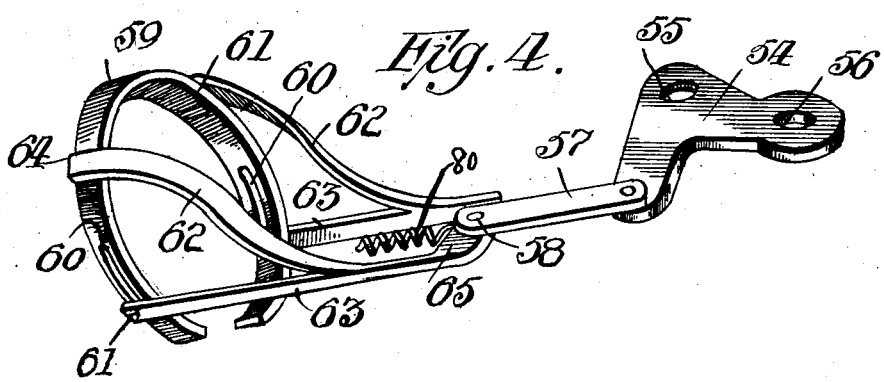
Witnesses:
Inventor,
A. A. Anderson,
By N. C. Everts & Co.
Attorneys.

No. 749,013.

Patented January 5, 1904.

UNITED STATES PATENT OFFICE.

ANDREW A. ANDERSON, OF SCOTTHAVEN, PENNSYLVANIA.

MACHINE FOR FORMING SLEEVES, COUPLINGS, OR THE LIKE.

SPECIFICATION forming part of Letters Patent No. 749,013, dated January 5, 1904.

Application filed June 24, 1903. Serial No. 162,827. (No model.)

*To all whom it may concern:*

Be it known that I, ANDREW A. ANDERSON, a citizen of the United States of America, residing at Scotthaven, in the county of Westmoreland and State of Pennsylvania, have invented certain new and useful Improvements in Machines for Forming Sleeves, Couplings, or the Like, of which the following is a specification, reference being had therein to the accompanying drawings.

This invention relates to certain new and useful improvements in machines for forming sleeves, couplings, and the like, and has for its object the provision of novel means whereby a strip of material may be cut and rolled into the desired form and size, means being provided to automatically disengage the finished article from the rolls, whereby another article may be readily formed.

Another object of my invention is to provide a machine whereby a coupling or sleeve may be formed in an easy, quick, and effectual manner, means being provided whereby the operation of the machine may be controlled and operated from one position by the operator.

Briefly described, my invention comprises a hydraulic cutting-machine into which is fed the heated metallic strips, and adjacent to said cutter is located the forming-machine, which is also operated by steam or air means, and upon this forming-machine is provided means whereby as the article is finished the same will be ejected from the machine, whereby the forming of another sleeve or coupling may be accomplished.

Another feature of my improved machine resides in the provision of novel means whereby different sizes of sleeves and couplings may be readily formed, the mechanism comprising my improved machine being so provided as to form a sleeve or coupling of any desired size and in a quick and effectual manner.

In describing the invention in detail reference is had to the accompanying drawings, forming a part of this specification, and wherein like numerals of reference indicate like parts throughout the several views, in which—

Figure 1 is a top plan view of my improved machine. Fig. 2 is a side elevation of the machine. Fig. 3 is a detail view of the cutter. Fig. 4 is a detail perspective view of the ejecting mechanism. Figs. 5, 6, and 7 are views illustrating the forming wheel or roll of the machine, and Fig. 8 is a detail perspective view of the auxiliary platform.

To put my invention into practice, I provide a cutter and forming-machine, the latter being also operated by steam or air, each of said parts being located in an operative position to each other, and in the illustrations I have shown the same as located upon a suitable base 1, although it is obvious that the apparatus may be suitably mounted upon the ground.

In describing the invention reference will be first had to the steam or air cutter 2, which comprises the side walls 3 and 4, forming the casing, and the top of said casing is cut away, as indicated by reference-numeral 5, and between the side walls 3 and 4 is mounted the steam or air cylinder 6, which is supported between the side walls by the U-shaped arms 7 and 8, the lateral portion of said arms extending through slots 9 and 10, formed in the side walls 3 and 4 of the casing. The vertical portion of these arms carry bosses 11, having apertures formed therein through which is adapted to pass the rods 12 and 13, having a screw-threaded portion 14, which is adapted to be threaded in the bosses 11 of the arms. These rods are supported in the outwardly-extending flanges 15, carried by the ends of the casing, and a nut 16 is provided upon one end of the rod 12 and a thumb-screw 17 upon the other end, whereby the rod may be rotated and the position of the cylinder 6 adjusted as may be desired. Upon the top of the casing I provide the U-shaped standards 18, upon which are mounted the pulley-wheels 19, over which is adapted to pass a rope 20, having a weight 21 connected to its one end, while the other end of said rope is adapted to be secured to a projection 22, secured upon the top of the cylinder 6, this projection being formed integral with the cutter-piston 23, located centrally within the cylinder 6.

To operate the cylinder 6, I provide the flexible couplings 24, whereby when a horizontal adjustment of the cylinder takes place the pipes 25 and 26 will be in continuous engagement with the cylinder, so the same may be operated. When the cylinder 6 is laterally adjusted within the casing 2, the pulleys 19 are adapted to be moved upon the U-shaped standards 18, whereby the weights 21 will be in continual vertical alinement with the cylinder. In the base of the casing 2 I provide the platform 27, which extends outwardly, as indicated at 28 and shown in Fig. 2 of the drawings, and in the top face of said platform I provide the slot 29, in which is adapted to be placed the metallic strip to be formed.

Located adjacent to the platform 27 I provide the forming apparatus 30, which consists of a casing 31, which is arranged at right angles to the end of the platform 27, and upon this casing I mount an operating-shaft 32 in the bearings 33 and 34, and upon the one end of the shaft I secure the forming wheel or roll 35. As illustrated in Figs. 5, 6, and 7 of the drawings, this wheel comprises a hub portion 36 and the rim 37, which is adapted to be slightly wider than the sleeve or coupling to be formed, and upon this forming wheel or roll I provide means whereby as the metallic strip is fed to the same it will be readily clamped and held in position until the wheel has made one revolution, when the sleeve or coupling will be ejected from the wheel. Upon the end of the shaft 32 which passes through the hub portion 36 of the wheel 35 I provide a lug 38, to which is pivoted a like 39, which passes outwardly through the slot 40, formed in the side of the rim 37 of the wheel, the outer end of said link being bent at right angles, as indicated at 41. I also provide a suitable bracket or guide 42, secured to the interior periphery of the rim, whereby the movement of the link 39 will be guided in its movement and rigidly held from any lateral movement, thus preventing the link from becoming disengaged from the slot 40. The hub portion 36 of the wheel has its outer side cut away, as indicated at 42, and adapted to engage in said cut-away portion are the lugs 43, formed upon the outer end of the shaft 32. The operation of this locking means carried by the wheel 35 will be hereinafter described in the operation of the machine.

Secured to the outer end of the shaft 32 I provide the pinion 44, which is adapted to mesh with the rack 45, formed integral with the plunger 46 of the cylinder 47. This cylinder is supported upon the standards 48 and is located in a position convenient to the forming apparatus, whereby when the piston is reciprocated the pinion 44 may be rotated in either direction. The outer end of this rack 45 is braced and supported by a standard 49, which is secured to the base of the machine 1 and carries the lateral extension 50, having flanges 51' projecting upwardly upon its side, whereby the rack or plunger will be supported in its lateral movement and prevented from becoming disengaged with the pinion 44. This standard 49 also partially supports the ejector mechanism and the means for operating the same, which consists of a horizontal bar 51, the outer end of which is supported in the standard 49, while the other end thereof is connected to the S-shaped hook 52, the one end of said hook being bifurcated and forming the hook portions 53, which lie in alinement upon each side of the rack or plunger, said hook 52 being further held in this position by the crank-lever 54, which is supported within the casing 31 of the forming apparatus. This crank-lever is pivoted in the casing, as indicated at 55, the one arm of said crank being pivoted to the horizontal bar 51, as indicated at 56, while the other end thereof is secured to a link 57, the forward end of said link being pivotally connected, as at 58, to the ejector mechanism, which consists of a metallic band 59, having slots 60 formed in its periphery, through which the bolts 61 pass, supporting the bracing-arms 63. These arms are formed integral with another set of arms 62, which are connected to the metallic band 59, as indicated at 64, the rear end of these arms forming a bridge 65, to which the link 57 is pivoted. It will be seen by the construction of the metallic band and arm 63 that this band may be adjusted to a smaller size, if desired, the object of which will be hereinafter more fully described.

Located upon each side of the rack 45 and the plunger 46 and preferably in vertical alinement with the cylinder 47 I provide the triangular standards 66, the altitude of these standards being secured to the base of the machine, as indicated at 67, while the other triangular arm 68 is secured to the base, as indicated at 69. These arms 68 form the hypotenuse of the triangular standard, and in these arms are pivoted the pulleys 70, which are mounted in the cut-away portion 71 of the arm, and adapted to rest and slide upon these arms 68 I provide the weights 72, which carry the downwardly-extending flanges 73, whereby they will be prevented from any lateral movement upon the arms, and connected to the one end of these weights are the ropes 73', which pass upwardly over the pulley 70, the other end of said rope or cable being connected to a pin 74, which is carried by the plunger 46. A pulley 75 is provided upon the vertical standard 76 of the triangular frames 66, this pulley being provided for the ropes or cables 73' to pass around, whereby any longitudinal movement of the plunger will impart a movement to the weights 72, which are adapted to slide upon the arms 68, the object of which will be hereinafter brought out.

In order to operate the cutter and the cylinder 47, I provide the pressure-pipe 77, which leads to the cylinder 47 and has a branch pipe 78 leading to the cutter-cylinder 6, whereby the operation of the cutter and the cylinder 47 may be simultaneously performed. I also provide exhaust-pipes 79, whereby the steam or air which is employed to operate the cylinders may exhaust.

The operation of my improved machine is as follows: When it is desired to form a sleeve or coupling, the metallic strip or bar, which has been previously heated to a desired heat, is placed upon the platform 27 of the cutter, the cutter having been adjusted within the framework 2 until the desired length of strip has been reached, when the cutter is operated by admitting the air or steam to the cylinder 6 through the pipe 77. As this operation is performed the heated metallic strip is gripped or secured to the periphery of the forming wheel or roll 35 by means of a slight rotation of the wheel. When the end of the metallic strip has been fed to the forming-wheel 35, the bent end 41 of the lever 39 is drawn inwardly, securing the metallic strip to the rim of the forming-wheel, the inward movement of the lever 39 being accomplished by a slight rotation of the shaft 32 previous to the rotating of the wheel 35. This is accomplished by the lug 38, formed on the end of the shaft, to which the lever 39 is connected, and it can be readily seen that the instant the shaft rotates this lever will be drawn inwardly, and upon further rotation of the shaft 32 the lugs 43 engage the hub portion of the wheel and rotate the same, as illustrated in Figs. 6 and 7 of the drawings. When the wheel 35 has made one revolution and formed the metallic strip in a circular form upon the periphery of the forming-wheel, the gripping end 41 of the lever 39 is released by the lugs 43 becoming disengaged by the hub of the wheel and allowing the shaft 32 to rotate until the lever 39 has been forced outwardly, thus releasing the metallic strip carried by the forming wheel or roll. Upon this operation being performed and upon further rotation of the shaft 32 by means of the pinion meshing with the rack 45 (the cylinder 47 having been previously charged to rotate the forming-wheel 35) the pins 74, carried by the piston 46, engage the hooks 53, supported in horizontal alinement with the rack 45, whereby the hooks 53 will be carried along with the movement of the rack and the lever 54 will be operated by means of the connection 56, connected to the rod 51. The movement of this lever 54 operates the ejector 59, whereby the sleeve or coupling which rests upon the periphery of the wheel 35 will be ejected or forced off of the wheel. This ejector mechanism is supported by the casing 31 and is adapted to lie in horizontal alinement with the wheel 35 and surround the same when the metallic strip is being ejected. When this operation has been performed, the piston 46 will be returned to its normal position by means of the weights 52, which are connected to the piston by the cables 73', and when the cutter has severed the metallic strip into the desired lengths the piston of the cutter is retured to its normal position by means of the weights 21, which are connected to the top of the piston by means of the cables 20. When it is desired to form a sleeve or coupling of a smaller or larger size, I employ a larger or smaller forming-wheel, which is constructed upon similar lines as the one illustrated in Figs. 5, 6, and 7 of the drawings, and when the larger or smaller forming-wheel is used the ejecting mechanism is adjusted to these sized wheels. The ejector-ring 59 may be made of some flexible material, whereby the same may be bent inwardly or outwardly to conform to the wheel, or another metallic ring of a different size may be placed between the arms 62 and 63. When a forming-wheel of smaller size is employed, the auxiliary platform, as illustrated in Fig. 8, is used, whereby an extension of the platform 27 will be provided, so the metallic strip will be fed to such a point as to be engaged by the forming-wheel and form.

In Fig. 1 of the drawings I have illustrated the pressure and exhaust pipes as connected to the cylinders, and to allow for the adjustment of the cutter-cylinder the flexible joints 24 have been provided, and any desired means may be employed in connection with these cylinders for controlling the operation of the same.

In order to return the ejecting mechanism to its normal position, I provide a spring 80, mounted within the casing 31, the one end of the spring being attached to the casing, while the other end of the spring is connected to the bridge 65 and a link 58 at their pivots, this spring being illustrated in Fig. 4 of the drawings. It will be readily seen that when the ejector is forced outwardly the spring is compressed and when the ejector is released the spring will force the same to its normal position.

While I have herein shown and described a practical embodiment of my invention, it will be obvious that various slight changes may be made in the details of construction without departing from the general spirit of my invention.

Having fully described my invention, what I claim as new, and desire to secure by Letters Patent, is—

1. A machine of the type set forth comprising a shearing apparatus, operating means therefor, a platform adjacent said shearing apparatus, means for adjusting the latter upon the platform, a forming apparatus, operating means therefor, and an ejector mechanism adapted to be actuated by the forming apparatus, substantially as described.

2. In a machine of the character described, an adjustable shearing apparatus, a platform therefor, a forming apparatus, means for operating the same, and an ejector mechanism adapted to be operated by the last-named means, said mechanism being adjustable to different sizes of forming means, substantially as described.

3. A machine of the character described, comprising a shearing apparatus, a platform mounted adjacent to said apparatus, means for operating said shearing apparatus, means whereby said apparatus may be adjusted upon the platform, a forming apparatus located adjacent to said platform, ejector mechanism carried by said apparatus, means for operating said forming apparatus, means carried by said forming apparatus to operate the ejector mechanism, substantially as described.

4. A machine of the character described comprising a shearing apparatus, a platform mounted adjacent to said apparatus, means whereby said apparatus may be adjusted upon said platform, means for operating the shearing mechanism carried by the apparatus, a forming apparatus comprising a forming-head, means carried by said head to grip the metallic strip to be formed, means carried by said apparatus for ejecting the formed article, means for operating said forming apparatus and ejector, substantially as described.

5. A machine of the character described, comprising a shearing apparatus, said apparatus being mounted within a suitable casing, a platform mounted adjacent to said casing, means carried by said casing for adjusting the apparatus, means for operating said shearing apparatus, a forming apparatus located adjacent to the shearing apparatus, said apparatus comprising a casing, a shaft mounted upon said casing, a forming-head secured to one end of said casing, means carried by said forming-head to grip the metallic strip to be formed, means for rotating said forming-head in either one or the other direction, an ejector mounted adjacent to said forming-head, means for operating said ejector substantially as described.

6. A machine of the character described, comprising a shearing apparatus, a casing surrounding said apparatus, means carried by said casing for adjusting the apparatus therein, a platform mounted within and adjacent to said casing, means for operating said shearing apparatus, a forming apparatus comprising a casing, a shaft mounted upon said casing, a forming-wheel secured upon one end of said shaft, a pinion secured upon the other end of said shaft, means carried by the forming-wheel to grip the metallic strip to be formed, ejector mechanism located adjacent to said forming-wheel, means for adjusting said ejecting mechanism to different-sized forming-wheels, a rack adapted to engage said pinion, means for reciprocating said rack, means carried by said rack for operating the ejector mechanism, substantially as described.

7. A machine of the character described comprising a shearing apparatus, a casing surrounding said apparatus, means carried by said casing for adjusting the apparatus therein, a platform mounted within and adjacent to said casing, means for operating the shearing apparatus, a forming apparatus comprising a casing, a shaft mounted upon said casing, a forming-wheel secured upon one end of said shaft, a pinion secured upon the other end of said shaft, means carried by the forming-wheel to grip the metallic strip to be formed, means carried by said wheel to release the gripping mechanism when the article has been formed, ejector mechanism located adjacent to said forming-wheel, means for adjusting said ejecting mechanism to different-sized forming-wheels, a rack adapted to engage said pinion, means for reciprocating said rack, means carried by said rack for operating the ejector mechanism, substantially as set forth.

8. A machine of the character described comprising a shearing apparatus, a casing surmounting the same, means for adjusting the said apparatus therein, a platform mounted within and adjacent said casing, a forming apparatus comprising a casing, a shaft mounted thereon, a forming-wheel carried by the shaft, gripping means for the metallic strip mounted on said wheel, means for releasing said gripping means, and ejector mechanism adapted to be actuated by the forming apparatus, substantially as described.

9. In a machine of the type set forth, a shearing apparatus, operating means therefor, a forming apparatus, comprising a shaft, a forming-wheel thereon, means for rotating the wheel in either direction, gripping means carried by said forming-wheel, releasing means carried by the said wheel for the gripping means adapted to be actuated upon formation of the article, operating means for the forming apparatus, an ejector mechanism, adjustable to different sizes of forming-wheels, and means whereby said ejector is adapted to be actuated by the forming apparatus, substantially as described.

10. In a machine of the character described, a shearing apparatus, means for actuating the same, a forming apparatus consisting of a casing, a shaft mounted thereon, a forming-head, gripping means carried by the head, releasing means therefor, and an ejector mechanism adapted to be operated by the forming means upon release of the formed article thereby, said mechanism comprising a flexible adjustable ring adapted to engage the head, adjustable arms secured thereto, a crank-lever pivotally secured to the arms mounted on the said casing, a hook member carried by said lever, and means for operating said forming apparatus adapted to actuate said ejector, substantially as described.

In testimony whereof I affix my signature in the presence of two witnesses.

ANDREW A. ANDERSON.

Witnesses:
R. J. FRICKER,
W. R. H. BUTLER.